(12) United States Patent  (10) Patent No.: US 8,037,086 B1
Upstill et al.  (45) Date of Patent: Oct. 11, 2011

(54) IDENTIFYING COMMON CO-OCCURRING ELEMENTS IN LISTS

(75) Inventors: Trystan G. Upstill, Mountain View, CA (US); Steven D. Baker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 513 days.

(21) Appl. No.: 12/166,718

(22) Filed: Jul. 2, 2008

Related U.S. Application Data

(60) Provisional application No. 60/948,879, filed on Jul. 10, 2007.

(51) Int. Cl.
 *G06F 17/30* (2006.01)
 *G06F 17/21* (2006.01)
(52) U.S. Cl. ......... 707/767; 707/E17.017; 707/999.003; 704/10
(58) Field of Classification Search .................. None
 See application file for complete search history.

(56) References Cited

U.S. PATENT DOCUMENTS

| 5,331,556 | A | 7/1994 | Black |
| 5,594,641 | A | 1/1997 | Kaplan |
| 5,832,474 | A | 11/1998 | Lopresti |
| 6,466,901 | B1 | 10/2002 | Loofbourrow |
| 7,155,427 | B1 | 12/2006 | Prothia |
| 7,752,204 | B2 * | 7/2010 | Kao et al. ............... 707/736 |
| 2003/0061122 | A1 | 3/2003 | Berkowitz |
| 2003/0187837 | A1 * | 10/2003 | Culliss ..................... 707/3 |
| 2003/0225749 | A1 * | 12/2003 | Cox et al. ................ 707/3 |
| 2004/0064447 | A1 * | 4/2004 | Simske et al. .......... 707/5 |
| 2005/0102282 | A1 * | 5/2005 | Linden ..................... 707/3 |
| 2007/0011154 | A1 * | 1/2007 | Musgrove et al. ...... 707/5 |
| 2007/0203929 | A1 * | 8/2007 | Bolivar ................... 707/101 |
| 2009/0112828 | A1 * | 4/2009 | Rozenblatt .............. 707/4 |

OTHER PUBLICATIONS

Stamou et al., "Retrieval Efficiency of Normalized Query Expansion," Lecture Notes in Computer Science 3406(2005): 604-607.*
Agirre et al., "Exploring Automatic Word Sense Disambiguation with Decision Lists and the Web," Dated 2000; 9 pages; Donostia, Basque Country.*
Schonhofen et al., "Feature Selection Based on Word-Sentence Relation," IEEE 2005, IEEE Computer Society, Proceedings of the Fourth International Conference on Machine Learning and Applications (ICMLA'05); 6 pages.*
Shen et al., "Query Enrichment for Web-Query Classification," ACM Jul. 2006, ACM Transactions on Information Systems, vol. 24, No. 3 pp. 320-352.*
Office Action for related case (U.S. Appl. No. 11/582,767), mailed from USPTO on Sep. 15, 2008.

* cited by examiner

*Primary Examiner* — Charles Kim
*Assistant Examiner* — Richard Bowen
(74) *Attorney, Agent, or Firm* — Fish & Richardson P.C.

(57) ABSTRACT

One embodiment of the present invention provides a system for detecting correlations between terms. During operation, the system identifies one or more lists contained in one or more documents and identifies two terms co-occurring in the lists. The system further determines a correlation between the co-occurring terms, and places the co-occurring terms in a correlated-pair list based on the correlation.

15 Claims, 12 Drawing Sheets

| Test 410 | Score 420 | Base 430 | High 440 |
|---|---|---|---|
| frequently_alterable 450 | Ratio of pseudo-queries of a particular type that can be derived from both the original phrase and the synonym<br>= (i)/TDQ | 0.01 | 0.015 |
| frequently_much_in_common 460 | Fraction of user queries for which an altered query has at least three search results in common with the original query<br>= (iv)/(ii) | 0.6 | 0.85 |
| frequently_altered 470 | Fraction of user queries for which the original query is followed by the altered query within a user session<br>= (v)/TDQ | 0.0005 | 0.0015 |
| high_altering_ratio 480 | Fraction of user queries for which the original query is followed by the altered query within a user session divided by the fraction of user queries for which the altered query is followed by the original query within a user session<br>= (v)/(vi) | 1.0 | 3.0 |

FIG. 4

IDENTIFYING COMMON CO-OCCURRING ELEMENTS IN LISTS

RELATED APPLICATION

This application hereby claims priority under 35 U.S.C. §119 to U.S. Provisional Patent Application No. 60/948,879 filed 10 Jul. 2007, entitled "IDENTIFYING COMMON CO-OCCURRING ELEMENTS IN LISTS," by inventors Trystan G. Upstill and Steven D. Baker.

The subject matter of this application is related to the subject matter in two co-pending non-provisional applications by the same inventors as the instant application and filed on the same day as the instant application entitled, "Using Geographic Data to Identify Correlated Geographic Synonyms," having U.S. patent application Ser. No. 11/923,424, and filing date Oct. 23, 2007, and entitled "Using Terms Known to be Related to Identify Additional Related Terms in Different Languages," having U.S. patent application Ser. No. 11/877,407, and filing date Oct. 23, 2007. The subject matter of this application is also related to the subject matter in a co-pending non-provisional application by the same inventors as the instant application entitled "Determining Query Term Synonyms within Query Context," having Ser. No. 11/096,726, and filing date 31 Mar. 2005, and to the subject matter in a co-pending non-provisional application by Steven Baker, Maureen Heymans, Evan M. Martin, Dimitra Papachristou, Trystan G. Upstill, and Ke Yang entitled "Method and Apparatus for Generating Lexical Synonyms for Query Terms," having Ser. No. 10/582,767, and filing date 17 Oct. 2006.

BACKGROUND

Embodiments of the present invention generally relate to the field of information retrieval, and more specifically to the task of identifying valid synonyms for query terms to facilitate retrieving documents which relate to the query terms.

The relentless growth of the Internet makes locating relevant information on the World Wide Web (the Web) an increasingly challenging task. While search engines can help users locate and retrieve a document of interest on the Web, users often fail to select effective query terms during the search. The problem of finding desired query results becomes increasing challenging as the amount of information available on the Web continues to grow.

For example, a user may enter the query [Web hosting + fort wayne] when the city of Fort Wayne is usually referred to as Ft. Wayne. Or, a user may enter [free loops for flash movie] when most relevant pages use the term "music," rather than "loops" and the term "animation" rather than "movie." Thus, documents that satisfy a user's informational needs may use different terms than the specific query terms chosen by the user. This problem is further aggravated as the number of terms in a query increases. For queries longer than three or four words, there is a strong likelihood that at least one of the terms is not the best term to describe the user's intended search. It is therefore desirable for a search engine to automatically modify and/or expand user queries to include synonyms for query terms, so that retrieved documents can better meet the user's informational needs.

This task has proven to be difficult. A simple approach is to use pre-constructed synonym information, for example, from a thesaurus or a structured lexical database. However, thesaurus-based systems have various problems, such as being costly to construct and being restricted to one language.

Some systems consider how often users substitute terms for one another during query sessions to determine whether the terms are synonyms. However, such substitutions can create false synonyms that are not meaningful, and which lead to unrelated or non-useful query results.

Accordingly, what is needed is a method and an apparatus that identifies potential synonyms without the above-described problems.

SUMMARY

One embodiment of the present invention provides a system for detecting correlations between terms. During operation, the system identifies one or more lists contained in one or more documents and identifies two terms co-occurring in the lists. The system further determines a correlation between the co-occurring terms, and places the co-occurring terms in a correlated-pair list based on the correlation.

In one variation of this embodiment, identifying one or more lists comprises identifying one or more of: an HTML list, a table, and an enumeration delimited by one or more special characters.

In one variation of this embodiment, the lists comprise HTML lists. In addition, while identifying the co-occurring terms, the system traverses the list items in the HTML lists based on HTML tags.

In one variation of this embodiment, while identifying the co-occurring terms comprises, the system determines a first number of lists where both of the terms occur and a second number of lists in which either one of the two terms occurs. Furthermore, the correlation between the two terms increases with the first number and decreases with the second number.

In a variation, while placing the co-occurring terms in the correlated-pair list based on the correlation further, the system determines whether the correlation is greater than a predetermined threshold.

In a variation of this embodiment, the system filters the documents to ensure that the documents are of different authorships.

One embodiment of the present invention provides a system for identifying a synonym for a query term. During operation, the system receives a query and generates a synonym candidate for a original term contained in the query. The system determines whether the synonym candidate and the original term are present in a correlated-pair list derived from co-occurring terms in lists. The system further determines whether the synonym candidate qualifies as a synonym for the original term.

In a variation of this embodiment, while determining whether the synonym candidate qualifies as a synonym for the original term, the system evaluates a synonym-confidence level associated with the synonym candidate and the original term, and adjusts one or more thresholds used in evaluation of the synonym-confidence level.

In a further variation, while adjusting one or more threshold, the system determines a likelihood of a user switching from a query containing the original term to a query containing the synonym candidate. The system further increases one or more thresholds when the likelihood is less than a predetermined value.

In a variation of this embodiment, the system computes a likelihood of a user switching from a query containing the original term to a query containing the synonym candidate. In doing so, the system measures a first number of switches from a query containing the original term to a query containing the synonym candidate over a period, from a pool of users. The system also measures a second number of queries containing the original term over the same period, from the same pool of users. The system then divides the first number with the second number.

In a variation of this embodiment, while determining whether the synonym candidate qualifies as the synonym for the original term, the system disqualifies the synonym candidate as the synonym when the synonym candidate and the original term are present in the correlated-pair list.

BRIEF DESCRIPTION OF THE FIGURES

FIG. 4 presents a table illustrating several tests that may be used to qualify the quality or strength of a candidate synonym in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media.

Crawling, Ranking and Searching Processes

Figure 1:
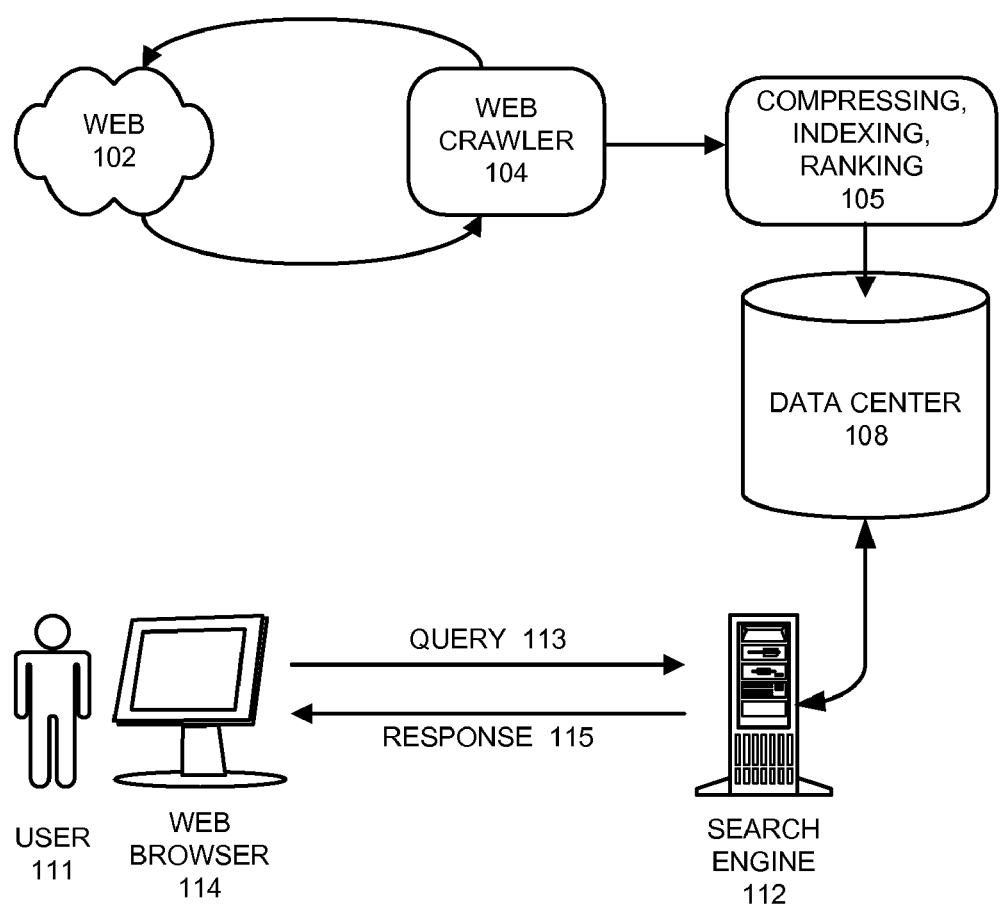
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a Web crawler 104 crawls or otherwise searches through websites on Web 102 to select Web pages to be stored in indexed form in data center 108. The selected Web pages are then compressed, indexed and ranked in module 105 (using the ranking process described above) before being stored in data center 108.

During a subsequent search process, a search engine 112 receives a query 113 from a user 111 through a Web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through Web browser 114, wherein the response 115 contains matching pages along with ranking information and references to the identified documents.

Note that some embodiments of the present invention do not require Web crawling. For example, the techniques described herein can also work with other document search and retrieval systems based on manually-controlled system such as human-maintained Web portals, directories, and paid inclusion.

Synonyms

Figure 2A:
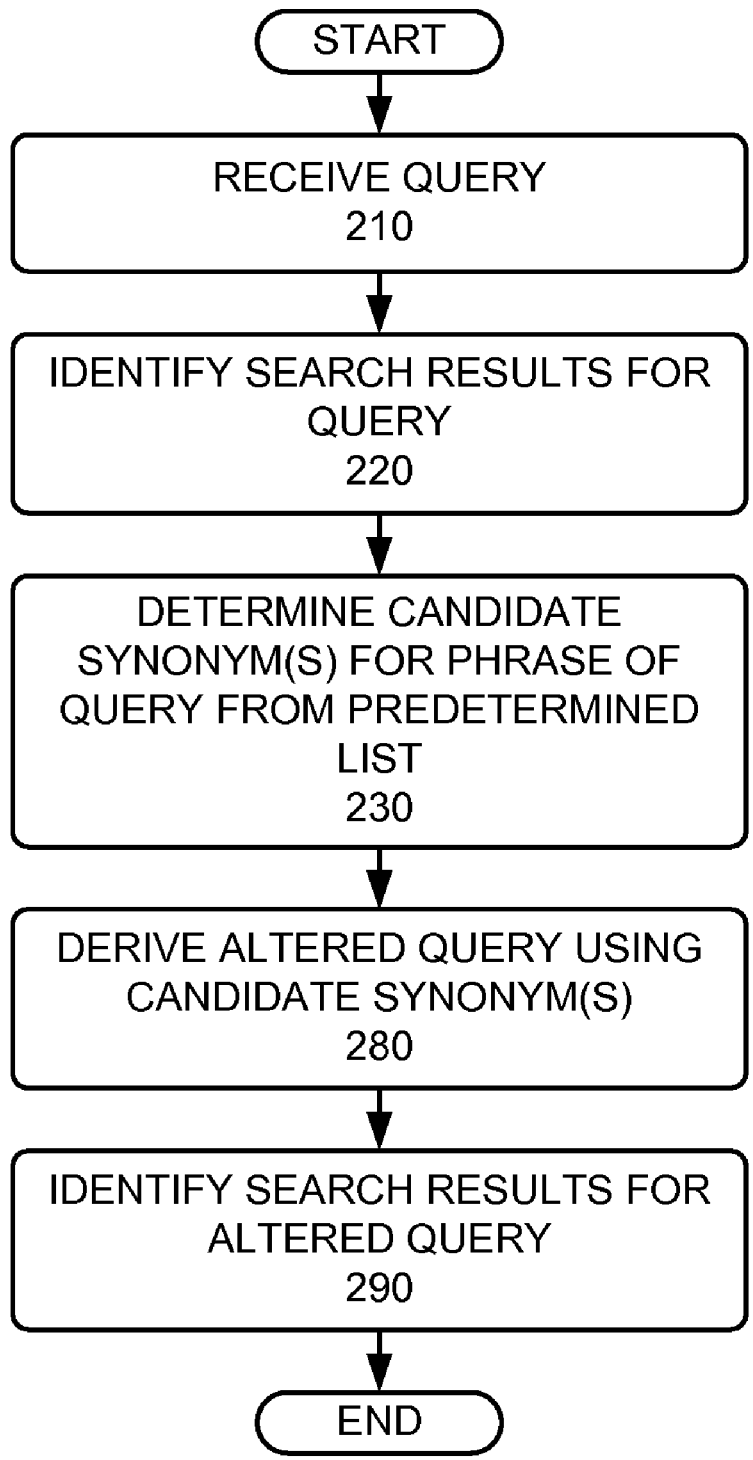
FIG. 2A presents a flowchart illustrating a method for producing altered queries in accordance with one embodiment of the present invention.

FIG. 2A is a flowchart illustrating a method for altering queries to incorporate synonyms in accordance with an embodiment of the present invention. After receiving a search query from a client, a front-end server provides the query to the search engine, which evaluates the query (operation 210). The front-end server and/or search engine can maintain log files or lookup tables for storing each received query and other information. For example, each query can be stored with a user identifier that identifies the browser and/or computer used by the user, a timestamp, and a list of some search results, such as the top ten document IDs that correspond to the search. Other information related to user context or the search itself may also be stored.

Next, a list of search results for the search query is identified (operation 220). The search engine then evaluates the query to retrieve a set of search results for the search query and returns the results to the front-end server. During this process, the search engine communicates with one or more content servers to select documents relevant to the search query. Typically, a content server stores a large number of indexed documents, which are indexed and/or retrieved from different websites. Alternatively, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999, which is incorporated by reference herein. The search engine assigns a score to each document based on the document's page rank (and/or other query-independent measure of the document's importance), as well as one or more query-dependent signals of the document's importance (e.g., the location and frequency of search terms in the document).

Figure 2B:
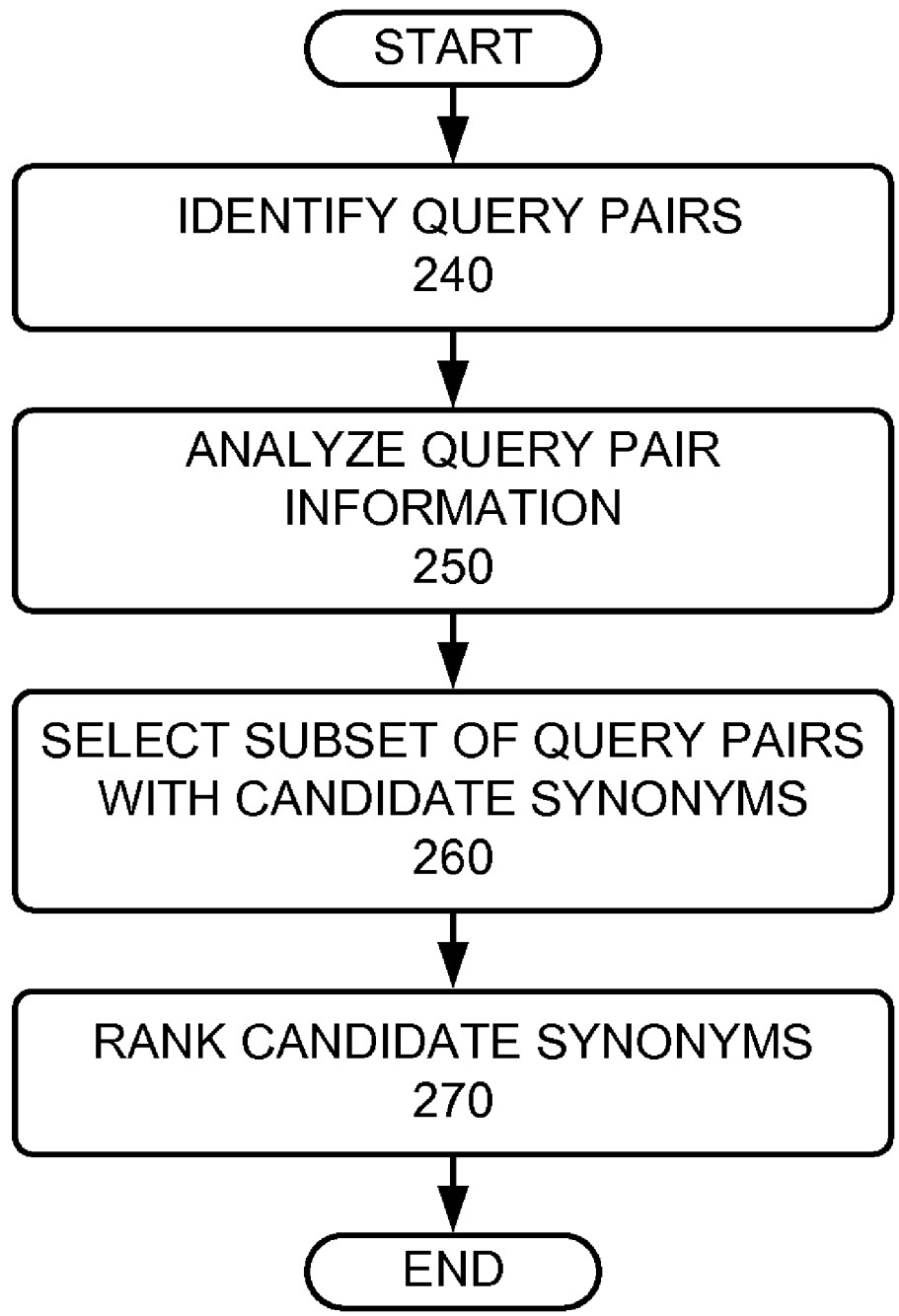
FIG. 2B presents a flowchart illustrating a process for determining one or more synonymous terms in the context of a query in accordance with one embodiment of the present invention.

Then, one or more synonymous terms associated with a context of the search query are identified based on a predetermined list (operation 230). Formation of the predetermined list may be accomplished using various processes. More specifically, FIG. 2B is a flowchart illustrating a process for determining one or more synonymous terms in the context of a search query according to one embodiment of the present invention.

First, query pairs are identified (operation 240). (An example of this process is further described in conjunction with FIG. 3 below.) In one embodiment, this is accomplished by analyzing user query logs and lookup tables. The set of all queries received over some period are reviewed and all original and altered query pairs are identified. An altered query is a query obtained by replacing a phrase in the original query with a candidate synonym. A "phrase," in the context of the present invention, is one or more individual words or terms.

For example, an original query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (operation 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effective synonymous, one or more additional tests can be used. One such test is to determine whether for every query containing a phrase A, a corresponding altered query with a phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

Note that the additional tests can be performed to determine the confidence level of a query candidate. Additionally, the system can perform a combination of these tests and assign a different weight to each test to compute an overall confidence level of the efficacy of a query candidate.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale :), in the context of preceding "photos," which can be indicated as (: photos), in the context of between "whale" and "photos," which can be indicated as (whale : photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free" in the general context (:); for only occurrences of "free" following "whale" in the context (whale :); for only occurrences of "free" preceding "photos" in the context (: photos); and for only occurrences of "free" between "whale" and "photos" in the context (whale : photos). Because many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not a good synonym for "free" in the general context, is a good synonym in the context (: photos), and is not a good synonym in the context (: press). The conclusion in this example is that the context (: photos) is an exception to the general rule that "download" is not a good synonym for "free."

From the query pairs, a subset is selected (operation 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (operation 270), or qualified, using the criteria discussed above. Initially, the system applies a set of threshold conditions, using the data gathered above as is discussed in greater detail in conjunction with FIG. 4. In one embodiment, the conditions may specify that, for at least 65% of the original-altered query pairs, there is at least one search result in common and that the frequency with which the altered query follows (e.g., occurs within five sequential queries) the original query within a user session is at least 1 in 2000. Then, the statistics from operation 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in operation 230 of synonymous terms, one or more altered queries are derived (operation 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternative queries are suggested that include the synonym, either as a substitution in or an addition to the query. In another embodiment, when a user enters a given query, a number of alternative queries can be provided back to the user, along with the search results for the original query according to various methods.

In one embodiment, the synonym is treated as equivalent to the original phrase automatically for purposes of document retrieval. For example, the original query can be modified by replacing the phrase with a synonym or a disjunction of the original phrase and a synonym when producing search results for the query.

Based on the results obtained in the above operations, a list of altered search results for the altered query is identified (operation 290). In one embodiment, this list may include a maximum number of results.

Figure 3:
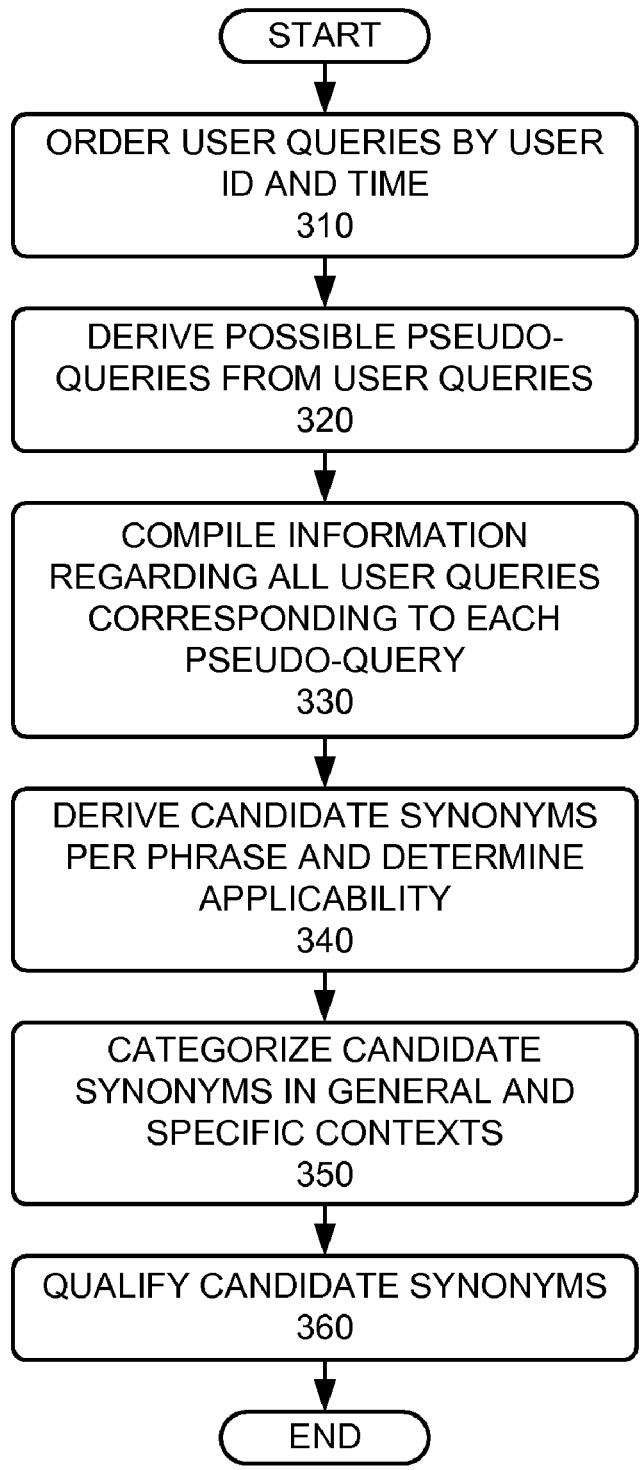
FIG. 3 illustrates an exemplary method for determining candidate synonyms for search query terms in accordance with one embodiment of the present invention.

FIG. 3 depicts an exemplary method for determining candidate synonyms for search query terms according to one embodiment of the invention. In one embodiment, the system sorts all queries received over a period of time, such as a week (operation 310) by user ID (e.g., by cookie), and then by time. This operation organizes the queries into individual user sessions, where a session is defined as queries from an individual client device (or user) occurring with a given time interval, for example one hour (though longer or shorter definitions of a session may be used, as desired). Assume that within a one hour window from one user, the following queries were logged from an individual client device:

[gm cars]
[gm new car prices]
[gm used car prices]
[general motors used car prices]

The system first eliminates certain queries as having insufficient context. In one embodiment, queries used in the analysis have at least three terms. Thus, in the forgoing example, the query [gm cars] is eliminated.

For each remaining query, all possible query fragments, or pseudo-queries, are formed by replacing a sequence of one or more terms with a marker or token (e.g., ":"), while leaving at least two words in the pseudo-queries (operation 320). For the query [gm used car prices], the pseudo-queries are:

[: used car prices]
[gm : car prices]
[gm used : prices]
[gm used car :]
[: car prices]
[gm : prices]
[gm used :]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session, which will be used to collect contextual information for the pseudo-queries, derive statistical information about term substitution, usage, and search result commonality (operation 330). Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Operation 330 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document IDs may be annotated, to reduce the required storage space.

For the above example user session, one data record produced for [gm used car prices] would be
{pseudo-query: [gm : car prices],
original_query: [gm used car prices],
phrase: used,
related_phrases: <{phrase: new, before: yes, after: no}>
top_results: <url370293847, url123985709, . . . >
}

Another data record would be
{pseudo-query: [: used car prices],
original_query: [gm used car prices],
phrase: gm,
related_phrases: <{phrase: general motors,
before: no, after:yes}>
top_results: <url370293847, url123985709, . . . >
}

Note that in these examples of pseudo-query records, the field delimiters (e.g., "pseudo-query:") are explicitly shown for illustrative purposes only, and in practice, would not necessarily be present in the actual records themselves. In addition, in these examples, "related phrases" are phrases that may be classified as candidate synonyms.

One of the data records produced for the query [gm new car prices] would have the same pseudo-query as the first record above:
{pseudo-query: [gm : car prices],
original_query: [gm new car prices],
phrase: new,
related_phrases: <{phrase: used, before: no, after: yes}>
top_results: <url123985709, url093475987, . . . >
}

Similarly, one of the data records produced for the query [general motors used car prices] would have the same pseudo-query as the second record above:
{pseudo-query: [: used car prices],
original_query: [general motors new car prices],
phrase: general motors,
related_phrases: <{phrase: gm, before: yes, after: no}>
top_results: <url370293847, url123985709, . . . >
}

Generating pseudo-queries operates specifies the range of potential contexts of each phrase implicit within each query. The records corresponding to an individual pseudo-query reflect what is known (i.e., across all user queries in the logs) about one set of queries that differ in only one phrase.

The system then analyzes records for each pseudo-query to generate a new set of records that reflect how well each phrase can function as a synonym for some other phrase, if it occurs in the given pseudo-query (operation 340). Pseudo-query records are sorted by pseudo-query such that all records with the same pseudo-query are grouped together. For example, assume that the records for the pseudo-query [: used car prices] include the two examples from above, plus two more, all of which are shown below:
{pseudo-query: [: used car prices],
original_query: [gm used car prices],
phrase: gm,
related_phrases: <{phrase: general motors,
before: no, after: yes}>
top_results: <url370293847, url123985709, . . . >
}
{pseudo-query: [: used car prices],
original_query: [general motors new car prices],
phrase: general motors,
related_phrases: <{phrase: gm, before: yes, after: no}>
top_results: <url370293847, url123985709, . . . >
}

```
{pseudo-query: [: used car prices],
    original_query: [ford used car prices],
    phrase: ford,
    related_phrases: < >
    top_results: <url283923887, url739572390, ... >
}
{pseudo-query: [: used car prices],
    original_query: [gm used car prices],
    phrase: gm,
    related_phrases: < >
    top_results: <url370293847, url123985709, ... >
}
```

Thus, there is another query, [ford used car prices], as well as another instance of the query [gm used car prices] from elsewhere in the logs. Operation 340 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, operation 340 creates a record for each of the phrases "gm," "general motors" and "ford." Each record includes candidate synonyms for the respective phrase.

In this example, each record output by operation 340 identifies the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, because relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [: used car prices], operation 340 would output:
```
{phrase: gm,
    original_query: [gm used car prices],
    related_phrases: <{phrase: general motors, common_urls: 5,
        before: no, after: yes},
        {phrase: ford, common_urls: 0, before:no, after: no}>
}
```

As illustrated, operation 340 passes on the session information from operation 330. For example, the data record above reflects the session queries "gm used car prices," "general motors used car prices," and "ford used car prices." In many cases, like "ford" in this example, there the original and altered queries may occur in different sessions, yet not occur together in a single session. Operation 340 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this operation are sorted by phrase, gathering together all records produced by operation 340 for each phrase.

For each phrase, operation 350 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," operation 350 receives the above record, plus two more:
```
{phrase: gm,
    original_query: [gm used car prices],
    related_phrases: <{phrase: general motors, common_urls: 5,
        before:no, after: yes},
        {phrase: ford, common_urls: 0, before:no, after: no}>
}
{phrase: gm,
    original_query: [gm new car prices],
    related_phrases: <{phrase: general motors, common_urls: 4,
        before:no, after: no},
        {phrase: 2005, common_urls: 0, before:no, after: no},
        {phrase: best, common_urls: 1, before:no, after: no}>
}
{phrase: gm,
    original_query: [nutrition of gm food],
    related_phrases: <{phrase: genetically modified, common_urls: 6,
        before: no, after: yes},
        {phrase: macdonalds, common_urls: 0, before: no, after: no}>
}
```

Operation 350 determines how many queries contained a particular phrase and computes statistics for each candidate synonym of the phrase. In one embodiment, this operation includes determining the number of queries for which the corresponding query with the synonym:

(i) existed (i.e., appeared in the logs);
(ii) existed and there was result data for both the original and altered queries, so that common results were computed;
(iii) existed and had at least 3 results in common;
(iv) existed and had at least 1 result in common;
(v) appeared earlier within a session; and
(vi) appeared later within a session.

Note that in the above operation the quantitative thresholds are for illustration purposes only. Other values of these thresholds can also be used.

In this example, for the phrase "gm" and the candidate synonym "general motors," the statistical data is:

(i) existed (i.e., appeared in the logs): 2;
(ii) existed and there was result data for both the original and altered queries, so that common results were computed: 2;
(iii) existed and had at least 3 results in common: 2;
(iv) existed and had at least 1 result in common: 2;
(v) appeared earlier within a session: 0; and
(vi) appeared later within a session: 1.

This data suggest that "general motors" is a good synonym for "gm," although, in practice, statistics may be gathered over at least 1000 queries including the phrase "gm" in order to have sufficient confidence in the statistics.

In addition to evaluating these statistics for each synonym in the general context, operation 350 also gathers statistics for each context in which the phrase occurs frequently. For example, statistics can be gathered for the 10,000 contexts for which the most queries exist. In this example, the contexts would be (:), (: used), (: used car), (: new), (: new car), (of :), (nutrition of :), (: food), and (of : food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Operation 350 evaluates the above statistics for each context, retaining, for each context, only the 20 most common candidate synonyms.

Operation 360 further qualifies candidate synonyms using various tests. FIG. 4 is a table illustrating several tests that may be used to quantify the quality or strength or confidence of a candidate synonym according to one embodiment of the present invention. The tests 410 apply to statistics gathered in operation 350.

The process begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries. The threshold values used in this particular embodiment are also for illustrative purposes only, and other values can be used as well.

If both preliminary conditions are satisfied, operation 360 evaluates a number of the statistics from operation 350 as a group and accords weight to each statistic. The evaluation can be based on the following function Scale ( ):

float Scale(float score, float base, float high) {
  float x=(score-base)/(high-base);
  float y=(x−sqrt(x*x+4.0))/2.0;
  return 1.0+y;
} where score 420 (ratio the test determines), base 430 (target value), and high 440 (scaling factor) are taken from the tests 410 of FIG. 4, which are described in greater detail below.

A series of tests 410 shown in FIG. 4 that apply function scale) to the data evaluated in operation 350. Scale ( ) is defined such that the value returned is 0 when score=base, asymptotically approaches 1 when score 420 is a large positive value, and is equal to (score-base)/(high-base) when score 420 is large negative. The value of base 430 reflects a desired value for the given test. The individual tests are defined as follows.

frequently_alterable 450 provides a measure of whether, for each query with the phrase of interest, the corresponding altered query occurs frequently enough (preferable more than 1%) to suggest that the candidate synonym makes sense in context. The result of this test is computed as the result (i) from operation 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. The result of this test is computed as result (iv) from operation 350 (had at least one result in common) over result (ii) of operation 350 (result data existed for both original and altered queries).

frequently_altered 470 evaluates whether users occasionally try the substitution. Preferably, for every 2000 user queries, there is a corresponding altered query within the same session. The result of this test is computed as result (v) from operation 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. The result of this test is computed as result (v) from operation 350 (appeared earlier within a session) over result (vi) from operation 350 (appeared later within a session).

The following parameters are then computed based on the above test results:
soft_and=frequently_alterable+2*frequently_much_in_common+0.5*frequently_altered+high_altering_ratio;
evidence=1.0−exp(-soft_and/1.5),
where exp ( ) is the natural exponential function, and soft_and reflects the totality of the test metrics. The above formula is only one possible embodiment of the present invention. Other formulae are also possible for computing the confidence level of a synonym candidate.

The value of evidence is a measure of the strength of or confidence in a synonym. An evidence value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" or "general motors." Alternatively, if the evidence for a synonym is relatively weak, the synonym can be used as suggestive rather than equivalent;

An aspect of the present invention includes a computer-implemented method to determine synonyms to serve as substitutions for phrases within an information search query. Candidate substitutions may be suggested to the user or automatically included in addition to or in place of the original query. Alternatively, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion described a generalized technique for discovering and generating context-sensitive synonyms. This technique is very useful, but it fails to take into account an important signal—lexical relationships between words. Consequently, the above-described technique misses many useful stems and other lexically similar words.

The following discussion remedies this problem by considering special classes of highly-trusted synonyms which are lexically related to the original word. We treat these synonyms differently and try to be more inclusive of them in our data. These lexically related words can be categorized in various ways, but all share the trait of there being a lexical connection between the original word and the synonym:
(1) synonyms that share the same stem as the original word, according to a industry-standard lexical stemming technique (e.g. car→cars);
(2) synonyms that differ from the original word according to punctuation or spacing differences (e.g. "wood stock"→woodstock, albertsons→albertson's);
(3) synonyms that are acronyms of the original word/phrase or vice versa. (e.g. VFW→veterans of foreign wars);
(3) synonyms that are similar according to a prefix-biased edit-distance technique;
(4) synonyms that are similar except for accenting on certain characters; and
(5) synonyms that are abbreviations of each other (hrs→hours).

The following section discusses exemplary implementations that detect lexical relationships between two words, as well as a scheme to include this signal in synonym generation (as described above) and scoring their confidences that can be applied generally to anything deemed lexically similar.

The following section first describes specific mechanisms for establishing lexical similarity, and then describes a general technique that can use these detection mechanisms.

Detecting Lexical Similarity

Decompounding/Compounding

One technique for detecting synonyms that differ from the original word only by punctuation or spacing is to run through the original word and the synonym, and remove all punctuation and spaces (both defined according to an accepted standard of character sets, e.g. UTF8). The system then compares the results, and if they are equal, the synonym falls into this class. These types of synonyms tend to be prevalent in Germanic languages. An example in English is woodshed→"wood shed". Stripping out the spaces from both, we get "woodshed" and "woodshed" which are identical. An example of a punctuation difference is albertson's→albertsons. After punctuation removal, "albertson's" and "albertsons" become the same.

Acronym Synonyms

If one of the words is a single word, the system can run a edit-distance procedure to align the original word and the phrase. "Edit distance" refers to the number of edits required to change one word to another word. In one embodiment, if a substantial number or fraction of the characters in the single word align with the first letters of the phrase (or vice versa), the system detects this word as an acronym. In addition, the system collects the first characters of all the words in the phrase and runs the edit-distance procedure again against the single word. If they are sufficiently similar within a predetermined number of edits, the system deems the single word as an acronym. In another embodiment, the system checks that all characters in the word align with the first character of each word in the phrase. For example, consider the acronym NASA→"National Aeronautic and Space Administration." The system extracts from the phrase "NAASA" and attempts to align that with "NASA." There would be one edit (the edition of an "A"). The maximum length of both strings is 5, hence $1/5=0.20$ is below 0.25, a predetermined edit-distance threshold. The edit-distance threshold needs not to be fixed, and could be set based on empirical measurements.

Pseudostems

Standard stemming as a conventional synonym-generation technique can often be overly conservative, because in the past it have been used to identify stems without the help of any additional signals. Embodiments of the present invention use standard stemming as just one signal in a system that produces high quality synonyms and stems.

In particular, embodiments of the present invention uses "pseudostemming," a technique that is fairly aggressive compared to conventional stemmers. During operation, if the original word and the candidate synonym differ by one edit, the system concludes that the candidate synonym is a pseudostem. Otherwise, the system uses a sequence of tests: First the system computes the length of the common prefix the two words share. In one embodiment of the present invention, the system determines whether the number of characters of matching prefix divided by the maximum length of either string is greater than a given threshold. For example, for "shuttler" and "shuttling," the common prefix is "shuttl," of length five. The maximum length is nine, therefore the ratio is 5/9, which is 0.56. An empirically determined threshold can be 0.5, hence this first test passes.

After the first test, the system examines the leftover strings of both words after the common prefix, which in the above example would be "er" from "shuttler" and the string "ing" from "shuttling." The system calculates the edit distance between the leftover strings, which is an edit distance of three in this example (using a character mismatch cost of one).

In another embodiment, the system can also require this edit distance of the leftover strings be less than a fraction of the maximum length of both strings. For example, the maximum length in the present example is nine, and a given fraction threshold is 0.4, hence the maximum edit distance for the strings to qualify as synonyms is 0.4*9=4.4. An edit distance of three is less than 4.4, hence in this case, the leftover edits would also pass this test. Because the two words in this example pass both tests, the system declares them to be pseudostems.

Diacriticals

In many non-English languages the use of diacritical marks and accents are fairly common. The system can remove these marks with both language-specific and universal de-accenting. If the words are substantially similar after accent removal, they classify as lexical variants. In addition to removing accents in the original words, the system can further input the de-accented words to any of the above techniques. This additional operation allows the system to capture the case where, for example, a character may be accented in the phrase for an acronym, but is not accented in the acronym itself. In one embodiment, comparing an accented to unaccented character does not count as an edit in the pseudo-stemming or other techniques.

Gender/Number Stemming Detection

In one embodiment, the system can use linguistic rules specific to each language and develop a classifier that detects a word to be a "conservative" stemming variant of another word.

Abbreviations

Many people use abbreviations or short-hands for words. For example, "hours" can be written as "hrs" or "people" as "ppl." In one embodiment, the system can detect abbreviations by removing vowels from both words and measure the edit distance. The system then determines whether the edit distance between the two shortened words is sufficiently small compared with the maximum length of both words. For example, removing the vowels from "hours" produces "hrs." The system computes the edit distance between "hrs" and "hrs," which is 0. The maximum length in this example is three characters, hence the ratio is 0/3, or 0.0. This ratio is less than an acceptable edit-distance threshold, which is empirically determined.

The above listed techniques are not exhaustive. The system can use the above techniques in addition to standard stemming techniques to identify trusted lexical synonyms. In particular, the system can use the Lovins and Porter stemmers. Other stemmers can also be suitable replacements.

Using Lexical Similarity Detection in a Synonym Generation System

The aforementioned technique uses various signals to verify whether a word is indeed a synonym. This technique can be extended to cover lexical synonyms. In one embodiment of the present invention, determining whether a word is a synonym involves considering: (1) a common result requirement, which specifies how frequently common query results should be produced when the word is substituted with the synonym in a query; and (2) a session switching requirement, which specifies how often a user switched the word with the synonym in a given session.

Note that the common result frequency and the session switching frequency provide a rough estimate of how closely the original word and the synonym are semantically related. Because the above detectors for lexical synonyms give us a stronger belief that the words are semantically related, we can lower our requirements for common results and for session switching for these classes of synonyms. The system can also determine how far to lower these requirements empirically.

It is observed that acronyms, compounds, and decompounds tend to have different results and sometimes exhibit low session switching. In one embodiment, the system requires no common results for such lexical variants. In a further embodiment, for compounds, decompounds, and punctuation variants, the system can use ⅓ of the requirement for session switching as compared with general synonyms, because compounds and simple punctuation variants generally carry the same meaning and therefore are more likely to be synonyms.

For pseudostems, stems, general/number stems, and abbreviations, the system can trade-off a high session switching rate and a high frequency of occurrence of queries with the substitution anywhere in the logs for a decreased common results requirement. In one embodiment, this includes a high threshold on session switching and the appearance anywhere in the logs (outside of sessions) of the synonym, which then triggers a lower threshold on common results. One could also create a different embodiment that trades the signals with an appropriate mixing function, which is approximated by the threshold in the embodiment above.

The above description specifies schemes that are specific to each lexical type in one embodiment of this invention, but one skilled in the art could recognize alternative schemes, such as categorizing the types into trust levels, symbolized by a number. This number could be used to modulate an aggressivity function for mixing signals that could be equivalent to the above embodiment.

Alternatives

There are a number of alternatives to the above-described techniques. One might use different stemming techniques to decide that tokens share the same stem. One might also use slightly different edit-distance techniques or a slightly different pseudostem filter (instead of using max length of strings, use average length, for example). One might also use the lexical signals to modulate synonym generation differently. Instead of using a different threshold for trusted lexical synonyms, we might rate the level of trust and divide some base threshold by trust.

Detecting Correlated Terms

Generalized methods for discovering and generating context-sensitive synonyms are useful, but sometimes produce terms that are not synonymous. For instance, a synonym-generation technique that uses query changes to generate synonym rules may find synonym rules such as white→yellow or January→February, which can sometimes shift the topic of the query (e.g., cause "topicality-drifting"). Examples of such topic shifts can include transitions between locations, which can cause the system to return query results that apply to a completely different geographical region.

In one embodiment of the present invention, the system uses a set of techniques that detect correlated terms, and may adjust system behavior in response. For instance, the system may detect a set of correlated terms that relate to a query term, and then structure a set of results for the query that convey both a "strict" set of results that do not encompass results from the set of correlated terms as well as an "expanded" set of results that also include search results derived from the correlated terms. Alternatively, the system may determine that such correlated are a negative influence, and be more conservative in building synonym rules for such correlated terms, or even filter out synonym rules relating to such correlated terms, For instance, the system may demote the signals generated by synonym rules that involve correlated terms.

Techniques to detect correlated terms can include techniques to: detect correlated geographic-entity terms; identify common co-occurring elements in lists; and identify additional correlated terms in different languages.

Note that in the following description, a query term and a possible synonym can each comprise one or more words.

Correlated Geographic-Entity Synonyms

Synonym transitions between locations can often affect query results. Synonyms that cause location transitions relate geographical entities to one another, e.g. New York→New Jersey, San Francisco→California, Miami→Florida, and Germany→France. Note that such problematic transitions can occur in multiple languages. For instance, the system may detect a transition from Ungarn→Österreich, the terms used for Hungary and Austria in the German language.

Often such geographic synonyms are in fact related. In the above examples, New York and New Jersey are neighboring states, and Miami is a city within the state of Florida. Because these geographic entities are so strongly related, and may even sometimes be useful as synonyms, determining whether they should be used as synonyms can be difficult. However, changing the geographic area for a query can lead to dramatically different (and potentially inaccurate) query results. Hence, it is desirable to intelligently identify correlated geographic-entity terms that are used as synonyms.

In one embodiment of the present invention, the system uses geographic data to identify correlated geographic terms. During operation, the system receives a term and a possible synonym for the term. The system determines whether the term and the possible synonym are both present in the geographic data set, and, if so, uses the geographic data set to determine whether the possible synonym is a correlated geographic synonym for the term.

Geographic Data Sets

In one embodiment of the present invention, the system receives as an input a geographic data set that lists major world geographic entities and the relationships between them. For instance, this geographic data set can include a list of countries, and the major cities within the countries. The geographic data set can also be more specific, e.g. including regions such as states, provinces, and/or counties. Furthermore, the geographic data set can optionally assign to each geographic entity one or more coordinates and/or a bounding box that describes a multi-dimensional area (such as a state, country, or large city) and/or shape.

The system can use an automatic translation system to translate the name of each geographic entity in the geographic data set into a set of different available languages. For instance, if an entity name is "Deutschland" in German, the system can translate the entity name into "Alemania" (in Spanish) and "Germany" (in English), thereby producing a list of entity names in a number of languages that are associated with the same location. Furthermore, the system can take the output list from this translation process and add all of the diacritical variants (in each respective language) to the set of possible entity names for a location. Hence, the system associates the set of geographic entities in the geographic data set with a list of different ways to write each entity name in each of many languages. The system can then invert this list to create a mapping from all of the entity names in each list to each respective corresponding geographic entity. Note that the translation process allows the translation of terms, but not transitions between words. Hence, the entity name "Munich" may be translated to "München" (the German name for Munich) as well, because both correspond to the same location, but "Munich" would never be mapped to "Berlin," because the two cities are distinct.

Figure 5:
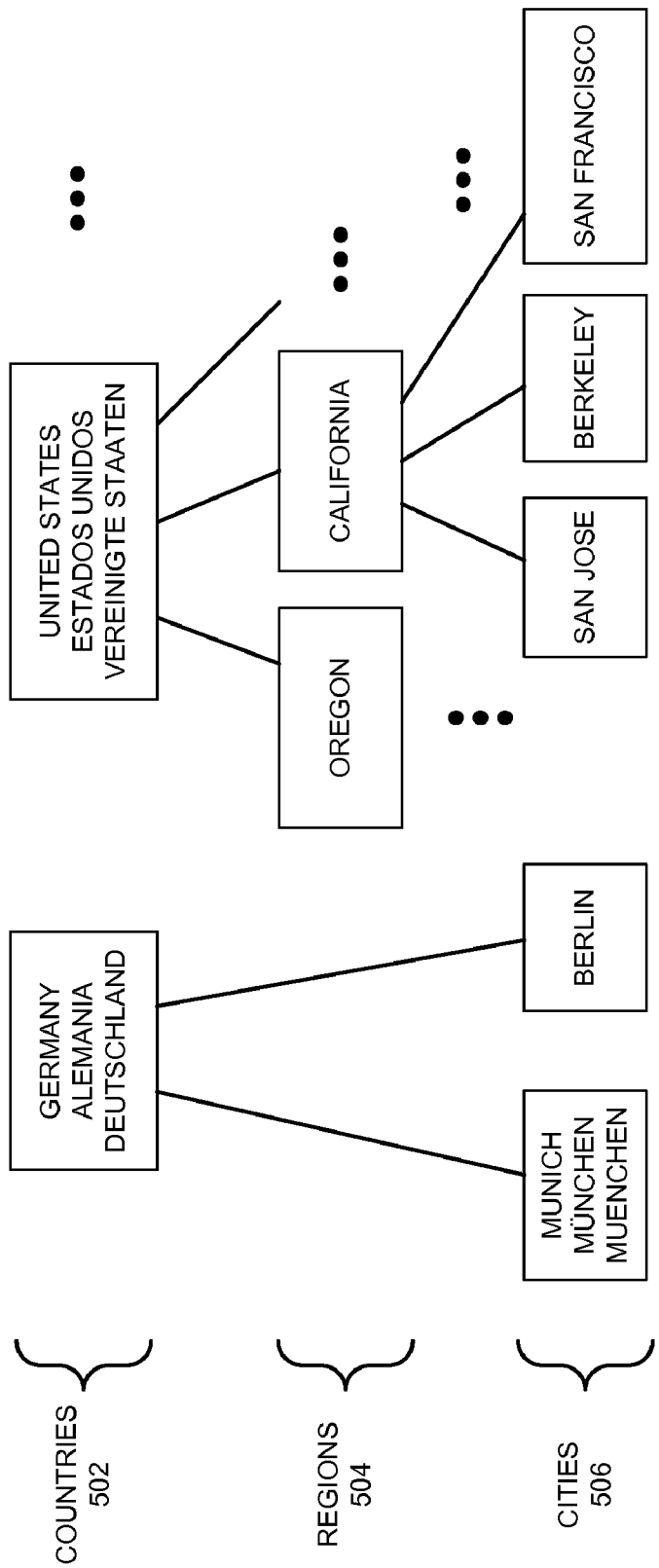
FIG. 5 illustrates how a geographic data set can be visualized as a tree of geographic entities in accordance with an embodiment of the present invention.

In one embodiment of the present invention, the geographic data set can be visualized as a tree of geographic entities, as shown in FIG. 5. At the top level of the tree are a set of countries 502, where each tree node that represents a country includes the set of words that are considered equivalent names for that country. For some data sets, the countries may be further broken down into geographic regions 504, such as states, provinces, and/or counties, each of which can include associated cities 506. Alternatively, if no region data is available for a country 502, the tree node for the country may instead point directly to a number of cities 506 in the country. If the data set does not include containment data for a geographic area, a bounding box technique (e.g. based on longitude and latitude data) may be used to distinguish the areas covered by a geographic entity or to determine if two geographic entities overlap. Note that when the system checks to see if a term is a geographic entity in the geographic data set, the system typically does not simply stop after the first match of the term with a location and/or area. Instead, because a given entity name may show up more than once at different levels or within the same level of the tree, the system may continue to search through the entire geographic data set for additional matches. For instance, the system may check whether the term is the name of one or more countries 502, regions 504, and/or cities 506.

Determining Correlated Geographic Synonyms

Figure 6:
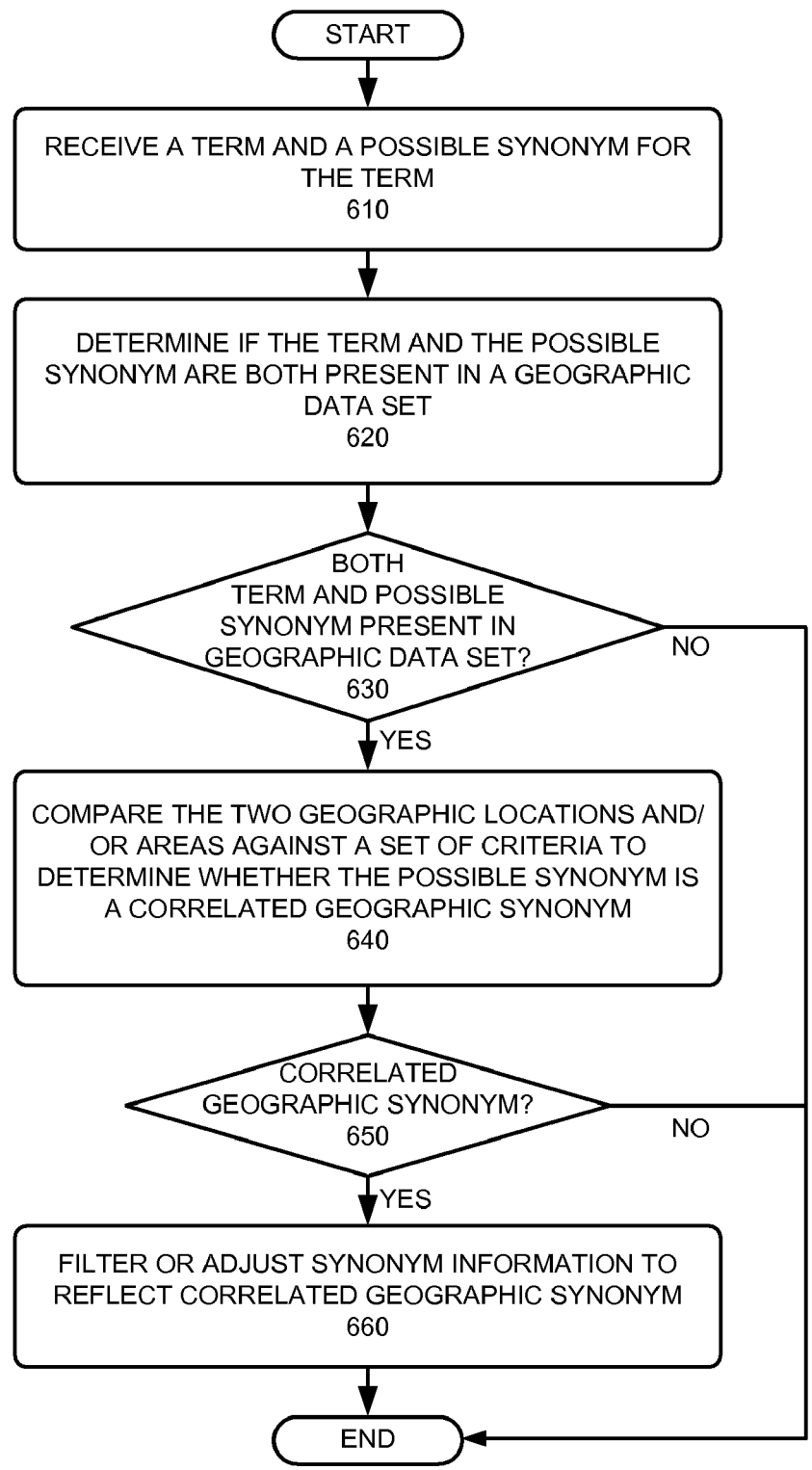
FIG. 6 illustrates the process of determining correlated geographic synonyms in accordance with an embodiment of the present invention.

FIG. 6 illustrates the process of determining correlated geographic synonyms in one embodiment of the present invention. First, the system receives a term and a possible synonym for the term (operation 610). Next, the system determines whether the term and the possible synonym are both present in the geographic data set (operation 620), which can involve determining geographic locations and/or areas related to the term and the possible synonym in the geographic data set. If the system finds no geographic entities in the geographic data set that match the term and/or the possible synonym (operation 630), the system determines that the term and the possible synonym are not correlated geographic synonyms, and the process completes.

If the system finds geographic entities that match the term and the possible synonym in the geographic data set (operation 630), the system compares the two geographic locations and/or areas against a set of criteria to determine whether the possibly synonym term is a correlated geographic synonym (operation 640). For instance, the system may determine that the term and possible synonym to form a correlated geographic synonym if:

both terms identify different countries (e.g. Germany and the United States);
both terms identify different regions in the same country and/or region (e.g. two states within the same country, such as New York and New Jersey);
both terms identify different cities in the same country and/or region (e.g. two cities in the same state, such as San Francisco and San Jose in California);
one term identifies a location, city, and/or area that is contained within a country or region specified by the other geographic location and/or area (e.g., "London" and "United Kingdom," where United Kingdom is the country to which the city London belongs in the geographic data set; and/or the city "Atlanta," which is in the region/state "Georgia" in the geographic data set); and/or
both terms identify different cities contained within a bounded area defined by a specified distance and/or shape (e.g. two cities within 100 miles of one another).

The system may determine criteria for correlated geographic synonyms based on observed problem synonyms or criteria received from a user or administrator. For instance, the system may determine the above criteria based on an observation that issues with correlated synonyms often arise for two geographic entities at a peer level (e.g. two countries, or two peer geographic entities in a country and/or region) or when one geographic entity contains the second geographic entity. If the system finds based on the criteria that the two terms form a correlated geographic synonym (operation 650), the system may in response filter a synonym rule or otherwise adjust synonym behavior (operation 660). If not, the system continues to consider the term and the possible synonym as valid synonyms.

In one embodiment of the present invention, the system analyzes the parent geographic area for transitions between cities and identifies the proximity of the two cities to determine whether the cities might be unrelated but have names that often correspond to reasonable synonyms. If the parent area or region for two cities is substantially the same, the system flags the two terms as correlated geographic synonyms. For example, "San Jose" and "San Francisco" share a parent region, California, and hence might be flagged as a correlated geographic synonym. To determine this, the system might make use of various proximity tests that identify whether an entity pair may be correlated. For instance, the system may only identify correlated geographic synonyms when the two terms are actually related in the real world due to a specified level of proximity. A fine-grained geographic data set may include cities contained in sub-country entities such as states or provinces, in which case this check may determine whether two cities are in the same state (e.g. a synonym rule mapping the city of Minneapolis and the city of St. Paul in the state of Minnesota, or a synonym rule mapping the city Davis to the city Sacramento in the state of California). For countries where the geographic data is sparser, the immediate parent region may have a coarser granularity, and checking the parent region for two cities may result in the system checking to see if the cities are both in the same country (e.g. mapping the city Munich to the city Berlin in the country of Germany).

In one embodiment of the present invention, the system can also determine a language variation and/or a lexical variation for the term and/or the possible synonym. For instance, the system may translate one or more terms into another language, or compute an unaccented form of one or more terms using a diacritical system. The system can then also check whether these additional variations are present as geographic entities in the geographic data set, thereby checking all translated and/or modified versions at the same time. Alternatively, the system may look up only one normalized form, for instance the unaccented form of a term. Looking up an unaccented form of a term or phrase may provide benefits when available synonym data includes obscure accented forms of terms which may not be present in an index of geographic entities.

In one embodiment of the present invention, the system may determine that an expanded set of terms representing the original term and an expanded set of terms representing the possible synonyms can produce a number of geographic entities in the geographic data set (e.g. a single term, such as "Springfield," may map to more than one town). In this situation, the system may analyze the geographic data for all possible pairings from the two sets of possible terms to determine whether each respective pair forms a correlated geographic synonym. For instance, for every element original_entity in the geographic entity set corresponding to the original term, the system can iterate through every element synonym_entity in the geographic entity set for the possible synonym, adding each pair (original_entity, synonym_entity) to the list of pairs to be tested.

For example, if the set of geographic entities for the original term is {o1, o2, o3}, and the set of synonym entities is {s1, s2, s3}, the system can generate the pairs {(o1, s1), (o1, s2), (o1, s3)} for o1, and a corresponding set of pairs for o2 and o3 as well. Once the system determines the possible pairs of geographic entities, it can apply a set of tests and/or criteria (as described above) to determine whether each pair forms a correlated geographic synonym.

In one embodiment of the present invention, the system considers how geographically-dense the city data for a country is in the geographic data set. Such geo-density data may be used as a factor in how aggressively the system decides on and/or handles correlated geographic synonyms. For instance, for countries with dense city data, the system can apply stricter geographic-closeness tests. Additionally, the system may automatically determine the density of cities in a region or country, and adapt accordingly.

In one embodiment of the present invention, the system may interactively seek user feedback. For instance, the system may present the user with identified correlated geographic synonyms, and allow the user to make adjustments and/or corrections to the query and/or synonym behavior.

Note that, as mentioned previously, the system may determine possible synonyms based on the context (e.g. the surrounding terms) for the original term and the context of the possible synonym. The system tracks subsuming contexts, where each subsequent context may be more general than a given target context. For instance, the terms York and Jersey alone may not be commonly found as a synonym rule. However, when the two include an anchoring term ("New"), the rule York→Jersey in the context (new :) becomes more likely, and the two terms become recognizable geographic entities (e.g., state names). Hence, checking for correlated geographic synonyms may involve checking longer phrases derived from the surrounding context. In one embodiment of the present invention, the geographic data set typically includes a limited amount of geographic data, and the system checks whether all or a number of possible terms and/or phrases in a given context are present in the geographic data set. The system may also incorporate data from the geographic data set as well as other query terms to determine whether the context of the query is incorrect (e.g. "Golden Gate Bridge Oakland" vs. "Golden Gate Bridge San Francisco").

Note that in some situations using geographic synonyms may improve query results. For instance, a user searching for a restaurant located near the border of the cities of Minneapolis and St. Paul, but actually in St. Paul, may (erroneously) use the query "Hunan Garden Minneapolis." Collected synonym data may provide a synonym rule "Minneapolis→St. Paul" that could assist in this case, but such a rule might in turn be eliminated by a system that detects correlated geographic synonyms. One alternative is for the system to demote, but not eliminate, correlated geographic synonyms, so that high-rank results arising via the synonym rule will still be considered in the query results. In this example, a high-ranking result for the restaurant in the town of St. Paul could still be returned, even though the query specified Minneapolis. Another example is the query "Australia scuba rental" in light of a synonym rule Australia→Sydney. While Sydney is geographically in Australia, using the synonym rule may provide some beneficial results, and synonym rule demotion may be more appropriate than synonym rule elimination, depending on the circumstances, the query context, and the set of query results for all related queries. The system may be tuned to weigh separate criteria differently. For instance, the system may always eliminate country-to-country and city-to-containing-state transitions, but only reduce the weight of, and not eliminate, city-to-city transitions for cities in the same geographic region.

Note also that the system operate under different conditions. For instance, the system may determine whether a term and a possibly synonym for the term are correlated geographic synonyms while actively processing queries (e.g. in an online mode), or while evaluating one or more synonym rules in an offline mode.

Identifying Common Co-Occurring Elements in Lists

The aforementioned synonym-generation approaches can be very effective in generating synonym candidates. However, synonym misidentification can still occur and words with opposite meanings can be falsely considered as synonyms. For example, the above approach could misidentify "army" and "navy," "cat" and "dog," or "LCD" and "CRT" as synonyms. It is therefore desirable to screen the synonym-candidate pairs and filter out non-synonyms.

Embodiments of the present invention provide a method and a system for generating a collection of non-synonymous pairs and using this collection as a heuristic to apply higher confidence thresholds to such pairs for inclusion as a synonyms. To accomplish this goal, the inventive system includes two components. The first component identifies correlated pairs based on a document corpus. The second component uses a collection of correlated pairs to demote them as synonyms.

The first task in identifying correlated pairs is to traverse a corpus of documents. A corpus refers a collection of documents, and can include all the pages available on the Web. Note that a "document" is not limited to a Web page. Generally, a document can include any information based on conventional media, such as paper, or electronic media. Examples of documents include books, newspapers, news letters, emails, electronic files, applications, instant messenger (IM) messages, audio files, video files, or other data or applications that may reside on one or several of computer systems, such as a network.

The importance, or weight, of the occurrence of a term in a document increases proportionally with the number of times the term appears in the document, but is offset by the frequency of the word in the corpus. In other words, if a term is more likely to occur in a large number of documents, the importance of this word's occurrence decreases, because it is more likely that the term is commonly used and its occurrence carries less significance. In addition, documents from the same source or same author are more likely to contain the same words, and therefore such documents carry less weight in determining the importance of those terms which occur therein.

Hence, the system can filter the corpus to improve the quality of the documents. For example, the system can restrict the documents within a corpus to be of different authorship. Note that "authorship" herein is broadly defined and not limited to mean only authors who wrote the document. Instead, documents of different authorship can be documents from different pages within one Web site, documents from different IP addresses, or documents submitted by different users. In addition, the system can differentiate documents according to the type of Web site where the document is hosted. For example, if a document is hosted on a Web page, the system can determine authorship based on the IP address and sub-directory names of the location where the document resides. If a document is within a Web-based bulletin-board system (BBS), the system can determine authorship of a post by the user ID of the user who posted In general, any type of document filtering schemes can be used to improve the quality of the corpus.

Subsequently, the system traverses the corpus and searches for lists which contain co-occurring elements or terms. The terminology "list" generally refers to structured data containing enumerated pieces of information, such as lists of restaurants, lists of automobile types, lists of names, etc. A list can be defined in a number of different ways. For example, a list may include an ordered list or unordered list. Special tags in a HyperText Markup Language (HTML) document identify the presence of ordered and unordered lists. An ordered list commences with an <OL> tag; whereas an unordered list commences with an <UL> tag. Each item in an ordered or unordered list is preceded by an <LI> tag.

Another type of list may include a definition list. A special tag in an HTML document identifies the presence of a definition list, which commences with a <DL> tag. Each item in a definition list is preceded by a <DT> tag. Yet another type of list may include document headers. Special tags in a HTML document identify headers using <H1> through <H6> tags. Other types of lists may be presented in yet other ways. For example, a list may be presented as items in a table or as items separated by commas, spaces, or tabs. Details of how to identify and generate a list are provided in U.S. patent application Ser. No. 10/425,819, entitled "Systems and Methods for Predicting Lists," filed 30 Apr. 2003, which is incorporated by reference herein.

Note that lists are not limited only to HTML lists. A list can be any enumeration of information delimited by one or more special characters. Furthermore, the system can traverse the lists during Web crawling. Other manual or automatic methods for list traversing are also possible.

In one embodiment, these lists of terms are considered as sets of interrelated terms. For each set of terms, the system records the frequency of encountering the set while traversing the corpus. Once all unique sets of terms, or lists, are collected, the system searches for term co-occurrence and rarity within sets. Particularly, the system searches for terms that occur frequently together, but do not occur frequently in all of the lists. For example, if "abc" and "123" occur in many lists, but only very occasionally together in a list, the correlation between "abc" and "123" is considered to be very low. By contrast, if a large number of sets mention "Lakers" and "Rockets" together, but only a few mention "Lakers" without mentioning "Rockets," or vice-versa, the two terms are considered to be correlated. In general, the system computes an association or correlation value that represents the strength of equivalence between two terms.

The system can adopt various models in computing the correlation between co-occurring list elements. In one embodiment, the system computes the correlation as follows. The system measures the number of lists where both terms occur. For example, the system records a first number of lists where both "Lakers" and "Rockets" are present. The system also measures the total number of lists where either "Lakers," or "Rockets," or both are present. In one embodiment, the correlation is then computed as the first number divided by the total number. The result indicates the correlation between the two terms. If this result is greater than a predetermined threshold, the system places the two terms in a correlated-pair "blacklist." Note that this example is only for illustration purposes. The system can adopt more fine-tuned and subtle models to more accurately reflect actual measured statistics.

Figure 7:
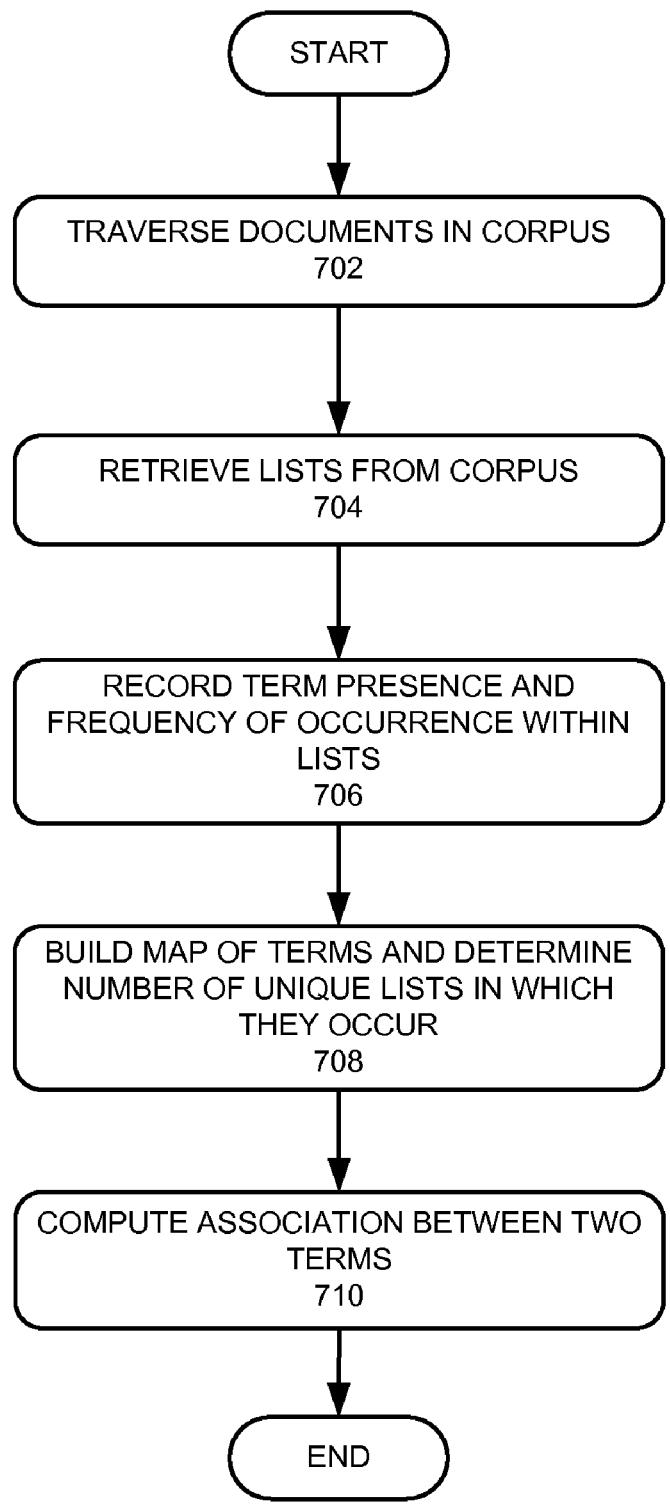
FIG. 7 presents a flow chart illustrating the process of identifying correlated pairs in accordance with one embodiment of the present invention.

FIG. 7 presents a flow chart illustrating the process of identifying correlated pairs in accordance with one embodiment of the present invention. During operation, the system first traverses the documents in the corpus (operation 702). The system then retrieves the lists from the corpus (operation 704). The system further records term presence in all the lists and frequency of occurrence within lists (operation 706). Subsequently, the system builds a map of terms and the number of unique lists in which they occur (operation 708). In one embodiment, the system only builds a map for terms for which the observed occurrence frequency is greater than a predetermined value (for example, 50).

Next, the system computes an association between two terms for all the terms that have been mapped (operation 710). In one embodiment, the system performs the following operations. First, the system determines whether a term A co-occurs with a term B in lists containing over N associations and also in M unique lists. In one embodiment, N is chosen to be 2 and M to be 10. Note that an association refers to a correspondence between two terms within a list, such as two corresponding entries in a row. For example, "republican" and "democrat" can be one association. The system can identify an association by analyzing the HTML tags. Alternatively, or in addition, the system can identify associations based on human inputs.

Second, the system computes term A's correlation to term B, which is denoted as A→B and defined as:

(number of times term A co-occurs with term B)*log [(total number of unique lists observed)/(number of unique lists containing term A)].

If the A→B correlation is greater than K, which in one embodiment is set to be 50, the system records the association A→B. The system performs the above screening process for all the term pairs, and obtains a collection, or "blacklist," of term pairs which can potentially be non-synonymous pairs (correlated pairs). Based on this blacklist, the system performs the second task of demoting the correlated pairs when determining whether the pair qualify as synonyms.

Different methods can be used to demote or penalize the correlated pairs. In one embodiment, the system can preclude term pairs present in the blacklist from being considered as synonyms. The system can also apply a threshold function to reflect a more subtle penalty, or demotion, imposed upon a correlated pair.

In one embodiment, the system applies a penalty formula to a correlated pair to ensure that, in order for the correlated pair to qualify as synonyms, a user is switching between the terms sufficiently frequently or that each term occurs frequently in high-ranking documents returned by queries based on the other term.

First, the system determines whether a large number of switches are present from a query containing the original term (denoted as "o") to an alternative query containing a substitute term or a synonym candidate (denoted as "a"). In one embodiment, the system can measure a likelihood of the o→a switch over a large number of query sessions by different users. For example, the system can compute the ratio of the number of o→a switches over the total number of distinct queries including the original word or phrase over a long period of time, based on a large pool of users. This measurement indicates the likelihood or probability of a user switching from an original query to an alternative query.

Next, if the o→a switch probability is sufficiently high, the system does not change the synonym thresholds. That is, even if the candidate words or phrases appear in the correlated-pair blacklist, the system does not penalize or demote the pair for consideration as synonyms, because a user is likely to switch between the pair based on empirical data.

If the o→a switch probability is low, the system applies stricter requirements for the pair to qualify as synonyms. For example, the system can increase one or more thresholds as described in the computation model for the evidence variable.

As an example of the above procedure, the system can set an o→a switch probability threshold to be 0.1. That is, the system measures the total number of o→a switches from a pool of users over a long period, and divide this number with the total number of queries containing the original word or phrase. If the result is equal to or greater than 0.1, the system does not change any of the thresholds used in the computation of evidence. If the result is less than 0.1, the system increases the base threshold for frequently_much_in_common to 0.9 and maintains the high threshold, thus making it more difficult for the correlated pair to qualify as synonyms.

Figure 8:
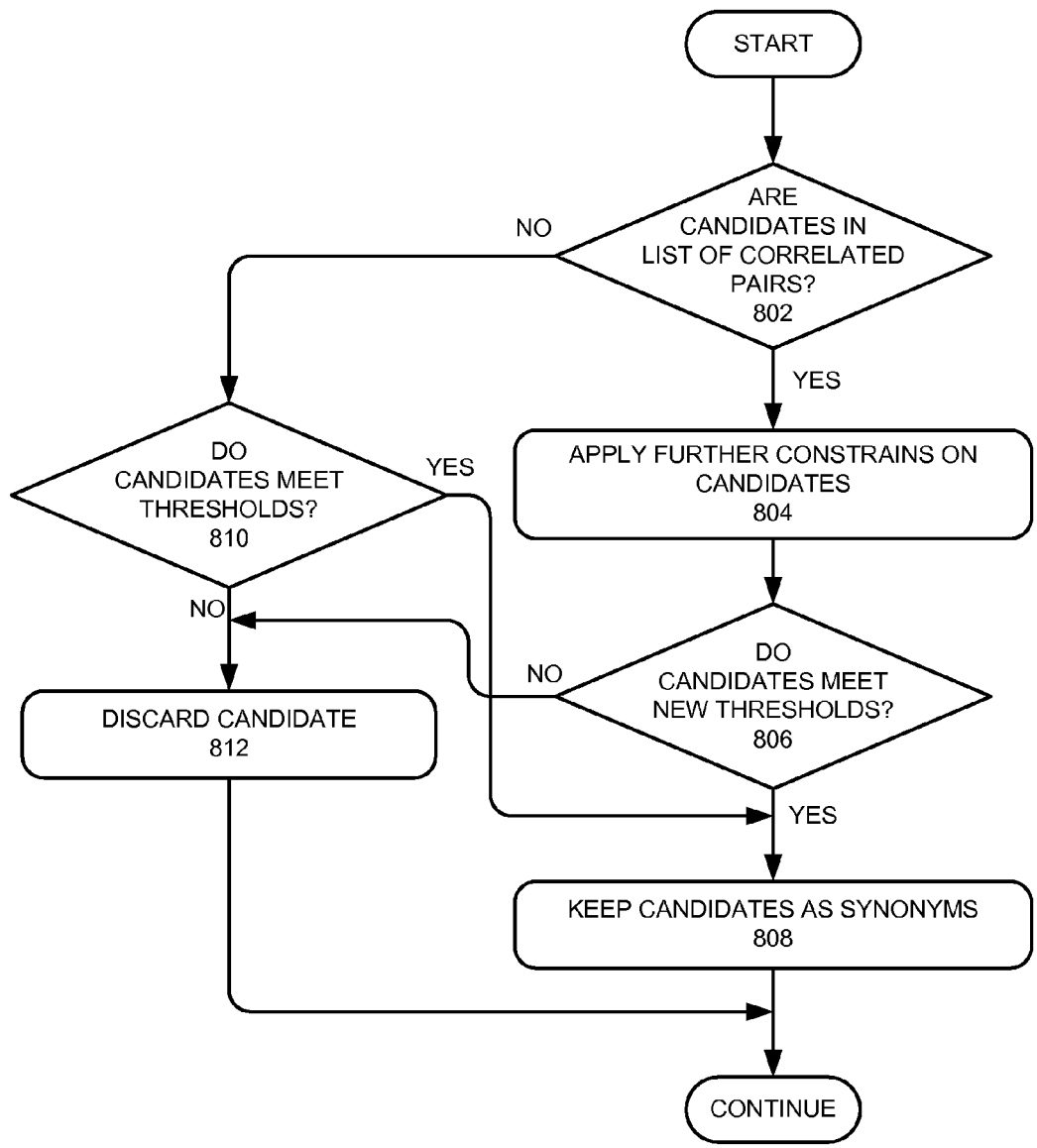
FIG. 8 presents a flow chart illustrating the process of screening correlated term pairs in accordance with one embodiment of the present invention.

FIG. 8 presents a flow chart illustrating the process of screening correlated term pairs in accordance with one embodiment of the present invention. During operation, the system performs this process on every identified synonym candidate based on an original query. The system first determines whether a pair of synonym candidates are in the list of correlated pairs (operation 802). If so, the system applies further confidence constraints on the synonym candidates as described above (operation 804). The system then determines whether the synonym candidates meet the new confidence thresholds (operation 806). If so, the system keeps the candidates as synonyms and generates an altered query based on the synonym (operation 808). Otherwise, the system discards the candidate (operation 812).

If the candidates are not in the list of correlated pairs, the system determines whether the candidates meet the original confidence threshold as described in conjunction with FIG. 4 (operation 806). If so, the candidates are kept as synonyms (operation 808). Otherwise, the system discards the candidate (operation 812).

Figure 9:
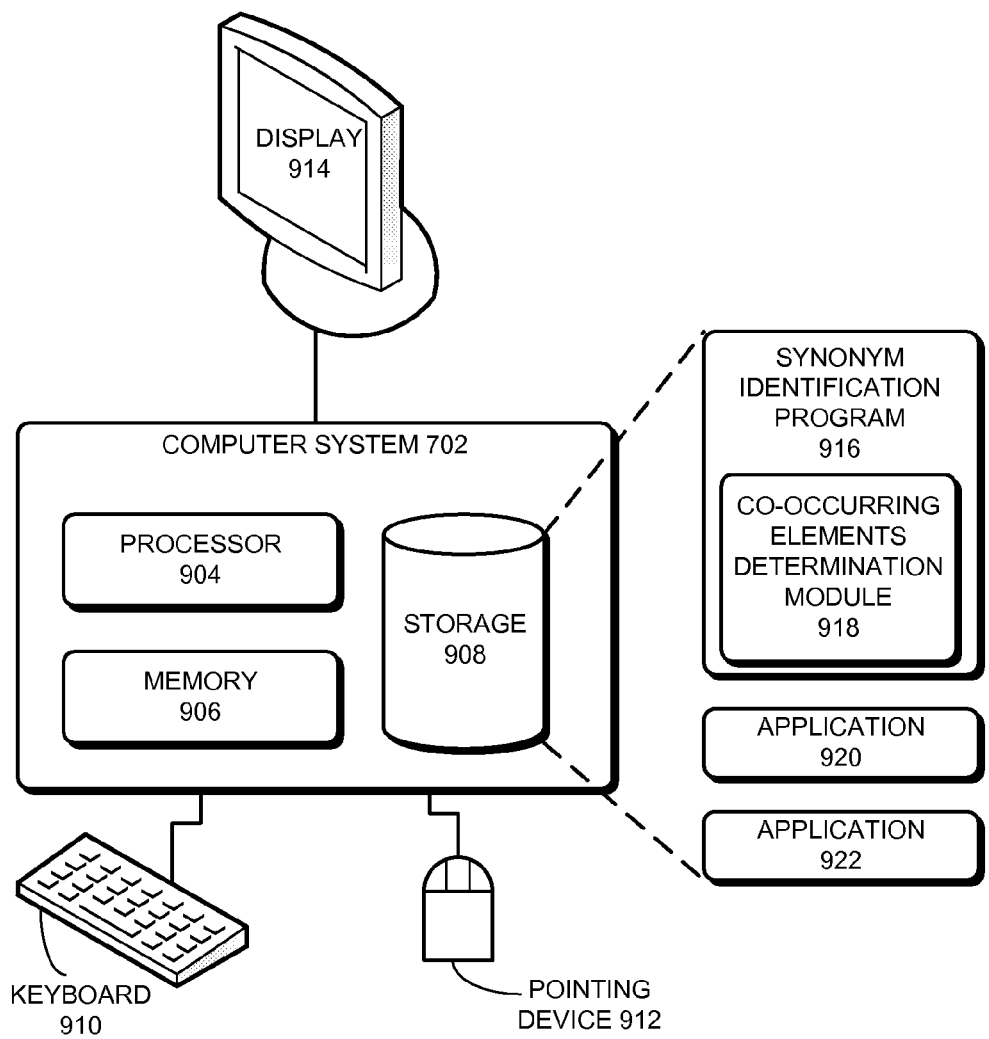
FIG. 9 illustrates an exemplary computer system for identifying common co-occurring elements in lists in accordance with one embodiment of the present invention.

FIG. 9 illustrates an exemplary computer system for identifying common co-occurring elements in lists in accordance with one embodiment of the present invention. A computer system 902 includes a processor 904, a memory 906 and a storage device 908. Computer system 902 is coupled to a display 914, a keyboard 910, and a pointing device 912.

Storage device 908 stores a number of applications, such as applications 920 and 922. Also stored therein is a synonym identification program 916, which includes a co-occurring elements determination module 918. During operation, synonym identification program 916 is loaded into memory 906 and executed by processor 904 to perform the aforementioned operations.

Identifying Additional Related Terms in Different Languages

As described in the previous section, techniques for generating synonym rules provide generalized methods for discovering and generating context-sensitive synonyms, but may sometimes produce rules for words that are related but not really synonymous. Examples of such rules include white→yellow, 1→2, Monday→Tuesday, and cat→dog. A list of such related terms may be specified for a synonym system to adjust synonym rules and/or system behavior. For instance, synonym rules that involve such terms may be displayed differently, or may be given either an increased or reduced weight. However, for a multi-language system, specifying such a list of related terms in every possible language, and across languages, can involve considerable effort.

In one embodiment of the present invention, the system uses a set of terms known to be related to identify additional related terms in different languages. During operation, the system receives two terms that are known to be related. Next, the system translates both terms into another language using an automated translation system. The system then adds the pair of translated terms to a gathered list of known related pairs.

Note that the system can receive one or more automatically-generated or manually-created pairs of related terms, where each pair in the list indicates two words that are related. Terms in the list of input pairs and in each given related pair may be specified in a common language or in different languages. For instance, a list of pairs specified in English can include: (red, green), (blue, red), (one, two), (vi, vii), and (dog, cat). Alternatively, a list of pairs may also be specified across languages, e.g. a mix of English and German: (red, blue), (red, grün), (eins, two), (grün, gelb).

Note also the technique described in the present invention can be used to determine related pairs across multiple languages for a wide range of input pairs. For instance, the set of examples in the previous paragraph comprise pairs of terms that are related to one another but typically considered non-synonyms. In this scenario, the system finds additional non-synonyms of this type across multiple languages. Alternatively, the system can instead receive as input a set of related pairs that are synonyms, for instance (cat, kitten), (fast, quick), and (weird, strange). In this scenario, the system finds additional synonyms across multiple languages. The system may use the resulting list of known related pairs in very different ways, depending on the relationship between the terms of the initial input pairs.

In some embodiments of the present invention, the system uses an automatic translation system to translate terms into multiple languages. For instance, the system may receive the pair (red, green) (in this case, specified in English), and then translate the pair into French, Spanish, Italian, and/or other languages. In some cases, the system may find more than one possible translation in the new language, especially in languages where there may be multiple word forms for a given word. In this case, the system may add pairs to the gathered list of known related pairs for each combination of possible translations for the pair. For instance, when translating (red, green) from English into Spanish, the system may determine that "red" can be translated into both "roja" and "rojo," and that green can be translated into "verde." In this case, the system might determine that two additional pairs output for Spanish would be (roja, verde) and (rojo, verde). The system could automatically add these pairs into the gathered list, and then repeat the translation process for the original pair into another language, such as French.

In one embodiment of the present invention, the system translates one or both terms into one or more languages. The system can then use the two resulting sets of translated terms to form same-language and/or cross-language pairs, and add those pairs to the gathered list. For instance, the system can take the cross-product of the two sets of translated terms found for the two original terms, and then add every possible pairing combination between the two sets to the gathered list.

Once the system has translated all of the original input pairs, and all of the translated pairs have been added to the gathered list, the system can use an access method to compare a potential pair of terms with the pairs in the gathered list. For instance, consider an application that has used the described techniques to determine pairs of non-synonym terms by expanding an initial set of known non-synonym pairs into a gathered list of non-synonym pairs. If a potential synonym pair being evaluated matches a pair in the gathered list, the system determines that the potential synonym pair is a non-synonym pair. For example, following the previous example, if, during operation, the system receives the pair (rojo, verde) as a possible synonym pair, the access method finds that this pair is present in the gathered list, and returns that the pair is likely to be a non-synonym pair. Otherwise, if a pair is not in the list, the access method may return "false," to indicate that the pair was not in the gathered list.

Note that the gathered list of known related pairs may be used both interactively (online) and in a batch (offline) way. For instance, the system can access the gathered list during a query, to determine whether a possible synonym for a term should be considered during the query. Alternatively, the system may receive as input a set of possible synonym rules for an online query system, and adjust the confidence of or otherwise change behavior relating to non-synonym pairs based on the contents of the gathered list.

In one embodiment of the present invention, the system can normalize a term and/or a translated term during the translation and/or lookup process. For instance, the system may generate both normalized and un-normalized versions of the pairs to ensure that unusual variations of terms are identified correctly.

In one embodiment of the present invention, the system determines variations for one or both of the terms in the original input pair, thereby effectively increasing the number of known related pairs. For instance, the system can determine high-confidence synonyms for a term and/or normalize a term prior to translating the term. The system can take the cross-product for two sets of such variations (derived from an original known related pair), and then use all of the resulting known related pairs as inputs to the described method, thereby generating additional known related pairs for the gathered list.

In one embodiment of the present invention, the system receives as an input a set of terms that collectively are related. For instance, the system might receive a set of all common colors, e.g. {red, green, blue, yellow, purple, etc}. The system can expand this set into an equivalent list of pairs comprising all possible pairings from the set, and then proceed to execute the previously-described method for each resulting pair. Exemplary sets of such related terms can include one or more of the following: different colors; different months; different days of the week; different numbers; different animals; and/or a set of terms specified by a user to be related.

Figure 10:
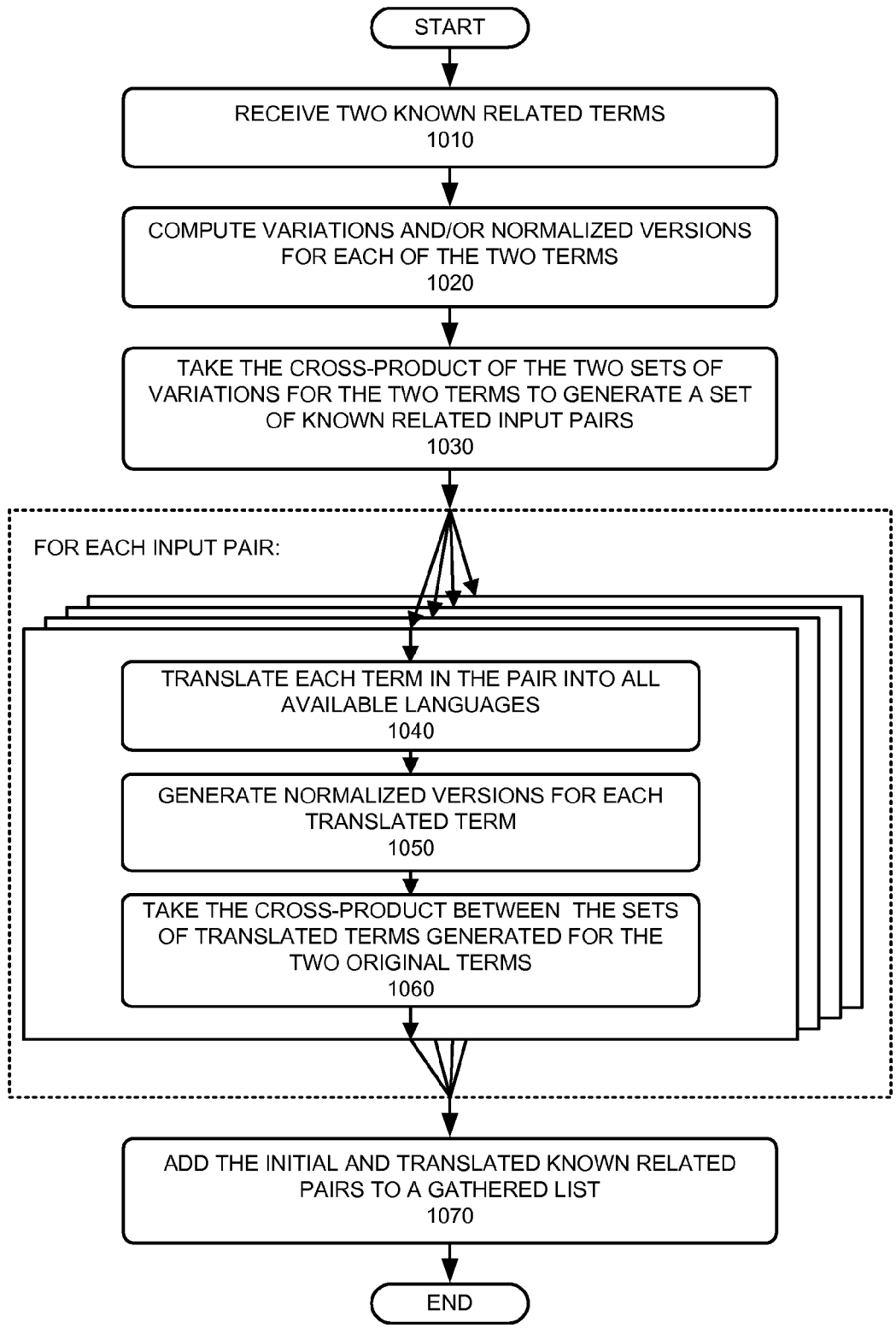
FIG. 10 presents a flow chart illustrating the process of generating a gathered list of known related pairs from an initial pair of known related terms in accordance with an embodiment of the present invention.

FIG. 10 presents a flow chart illustrating the process of generating a gathered list of known related pairs from an initial pair of known related terms. For instance, in the case where the initial pair of known related terms are two terms that are known to be related non-synonyms, this gathered list could serve as a blacklist of known non-synonym pairs. During operation, the system receives two terms known to be related (operation 1010). The system computes variations and/or normalized versions for each of the two terms (operation 1020), and then takes the cross-product of the resulting two sets of variations for the terms to generate a set of known related input pairs (operation 1030). Then, for each individual input pair in the set of known related input pairs, the system translates each of the two terms in the pair into all available languages (operation 1040), and generates a normalized version of each resulting translated term (operation 1050). Next, the system takes the cross-product between the two sets of translated terms generated for the two original terms (operation 1060). (Note that the system can include the original terms in the two sets when taking this cross-product, or also limit the cross-product operation to be on a per-language basis). The system then adds the initial and translated lists of known related pairs to a gathered list that can be used to detect related terms (operation 1070).

Figure 11:
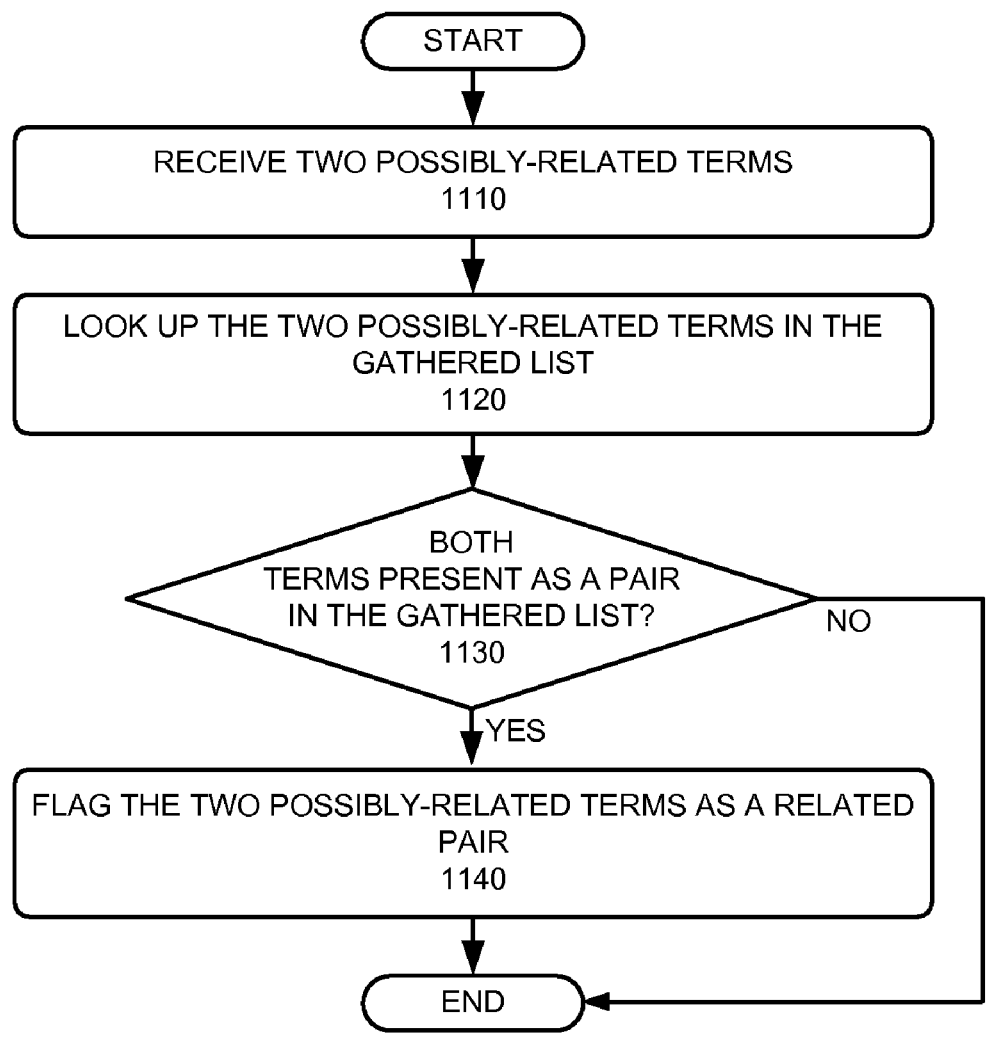
FIG. 11 presents a flow chart illustrating the process of using a gathered list of related term pairs to detect non-synonym terms in accordance with an embodiment of the present invention.

FIG. 11 illustrates the process of using a gathered list of related term pairs to detect related terms. During operation, the system receives two possibly-related terms (operation 1110). The system proceeds to look up the two possibly-related terms in the gathered list of related terms (operation 1120). If both terms are present as a pair in the gathered list (operation 1130), the system flags the two possibly-related terms as a related pair (operation 1140), and handles them accordingly. Otherwise, the system continues to consider the two terms as unrelated terms.

In summary, in one embodiment of the present invention the system translates terms known to be related into other languages to increase the set of known related terms. The described technique allows terms known to be related in a first language to be used to improve query results for queries specified in additional languages. Note that the input of the source list can be specified in any language (or mix of languages) that can be automatically translated into another language.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
receiving a pair of terms that includes a term and a candidate synonym of the term;
determining that the terms of the pair have been identified as being potentially non-synonymous;
evaluating the pair of terms using one or more penalty criteria that are only applied to terms that are identified as being potentially non-synonymous, comprising determining a quantity of switches that have occurred between queries that include the term and queries that include the candidate synonym of the term;
selecting, by one or more computers, a first threshold if the pair of terms satisfies the penalty criteria, or a second threshold if the pair of terms does not satisfy the penalty criteria, wherein the first threshold is a same threshold that is applied to pairs of terms that are not identified as being potentially non-synonymous, and wherein the second threshold is higher than the first threshold; and
determining that the terms of the pair are synonyms when the selected threshold is exceeded.

2. The method of claim 1, wherein the determining that the terms of the pair have been identified as being potentially non-synonymous comprises determining that the terms occur in a list of terms that are potentially non-synonymous.

3. The method of claim 1, wherein evaluating the pair of terms using one or more penalty criteria comprises:
determining whether the quantity of switches satisfies a predetermined threshold.

4. The method of claim 1, wherein evaluating the pair of terms using one or more penalty criteria comprises:
determining a first quantity, representing a number of times that users of a search engine have submitted queries that include the term;
calculating a ratio by dividing the quantity of switches by the first quantity; and
determining whether the ratio satisfies a predetermined comparison threshold.

5. The method of claim 1, wherein determining that the terms of the pair are synonyms comprises:
determining a confidence value associated with the pair of terms; and
applying the selected threshold to the confidence value.

6. A non-transitory computer storage medium encoded with a computer program, the program comprising instructions that when executed by one or more computers cause the one or more computers to perform operations comprising:
receiving a pair of terms that includes a term and a candidate synonym of the term;
determining that the terms of the pair have been identified as being potentially non-synonymous;
evaluating the pair of terms using one or more penalty criteria that are only applied to terms that are identified as being potentially non-synonymous, comprising determining a quantity of switches that have occurred between queries that include the term and queries that include the candidate synonym of the term;
selecting a first threshold if the pair of terms satisfies the penalty criteria, or a second threshold if the pair of terms does not satisfy the penalty criteria, wherein the first threshold is a same threshold that is applied to pairs of terms that are not identified as being potentially non-synonymous, and wherein the second threshold is higher than the first threshold; and
determining that the terms of the pair are synonyms when the selected threshold is exceeded.

7. The computer storage medium of claim 6, wherein the determining that the terms of the pair have been identified as being potentially non-synonymous comprises determining that the terms occur in a list of terms that are potentially non-synonymous.

8. The computer storage medium of claim 6, wherein evaluating the pair of terms using one or more penalty criteria comprises:
determining whether the quantity of switches satisfies a predetermined threshold.

9. The computer storage medium of claim 6, wherein evaluating the pair of terms using one or more penalty criteria comprises:
determining a first quantity, representing a number of times that users of a search engine have submitted queries that include the term; and
calculating a ratio by dividing the quantity of switches by the first quantity; and
determining whether the ratio satisfies a predetermined comparison threshold.

10. The computer storage medium of claim 6, wherein determining that the terms of the pair are synonyms comprises:
determining a confidence value associated with the pair of terms; and
applying the selected threshold to the confidence value.

11. A system comprising:
one or more computers; and
a computer-readable medium coupled to the one or more computers having instructions stored thereon which, when executed by the one or more computers, cause the one or more computers to perform operations comprising:
receiving a pair of terms that includes a term and a candidate synonym of the term;
determining that the terms of the pair have been identified as being potentially non-synonymous;
evaluating the pair of terms using one or more penalty criteria that are only applied to terms that are identified as being potentially non-synonymous, comprising determining a quantity of switches that have occurred between queries that include the term and queries that include the candidate synonym of the term;
selecting a first threshold if the pair of terms satisfies the penalty criteria, or a second threshold if the pair of terms does not satisfy the penalty criteria, wherein the first threshold is a same threshold that is applied to pairs of terms that are not identified as being potentially non-synonymous, and wherein the second threshold is higher than the first threshold; and
determining that the terms of the pair are synonyms when the selected threshold is exceeded.

12. The system of claim 11, wherein the determining that the terms of the pair have been identified as being potentially non-synonymous comprises determining that the terms occur in a list of terms that are potentially non-synonymous.

13. The system of claim 11, wherein evaluating the pair of terms using one or more penalty criteria comprises:
determining whether the quantity of switches satisfies a predetermined threshold.

14. The system of claim 11, wherein evaluating the pair of terms using one or more penalty criteria comprises:
determining a first quantity, representing a number of times that users of a search engine have submitted queries that include the term; and calculating a ratio by dividing the quantity of switches by the first quantity; and determining whether the ratio satisfies a predetermined comparison threshold.

15. The system of claim 11, wherein determining that the terms of the pair are synonyms comprises:

determining a confidence value associated with the pair of terms; and applying the selected threshold to the confidence value.

* * * * *